US009148187B2

(12) United States Patent
Bucher et al.

(10) Patent No.: US 9,148,187 B2
(45) Date of Patent: Sep. 29, 2015

(54) METHODS AND SYSTEMS FOR SELF-REFERENCING SINGLE-ENDED SIGNALS

(71) Applicant: Rambus Inc., Sunnyvale, CA (US)

(72) Inventors: Michael Bucher, Carboro, NC (US); Lei Luo, Chapel Hill, NC (US)

(73) Assignee: Rambus Inc., Sunnyvale, CA (US)

( * ) Notice: Subject to any disclaimer, the term of this patent is extended or adjusted under 35 U.S.C. 154(b) by 84 days.

(21) Appl. No.: 13/944,501

(22) Filed: Jul. 17, 2013

(65) Prior Publication Data

US 2014/0036977 A1 Feb. 6, 2014

Related U.S. Application Data

(60) Provisional application No. 61/678,823, filed on Aug. 2, 2012.

(51) Int. Cl.
*H04B 3/46* (2015.01)
*H04B 1/16* (2006.01)

(52) U.S. Cl.
CPC ........................................ *H04B 1/16* (2013.01)

(58) Field of Classification Search
USPC ........................................................ 375/224
See application file for complete search history.

(56) References Cited

U.S. PATENT DOCUMENTS

| 6,111,531 A * | 8/2000 | Farag ............................. 341/143 |
| 2007/0222510 A1* | 9/2007 | Hong et al. ..................... 330/86 |
| 2009/0189635 A1 | 7/2009 | Booth, Jr. et al. |
| 2011/0103458 A1 | 5/2011 | Huang et al. |

FOREIGN PATENT DOCUMENTS

EP 2134008 A1 12/2009

OTHER PUBLICATIONS

Emami-Neyestanak, Azita, "Design of CMOS Receivers for Parallel Optical Interconnects," Dissertation submitted to Department of Electrical Engineering of Stanford University, Aug. 2004. 142 pages.
Nazari, Meisam Honarvar et al., "An 18.6Gb/s double-sampling receiver in 65nm CMOS for ultra-low-power optical communication," 2012 IEEE International Solid-State Circuits Conference, Digest of Technical Papers (ISSCC), pp. 130-131, Feb. 19-23, 2012. 2 pages.
Palermo, Samuel, "Design of High-Speed Optical Interconnect Transceivers," Dissertation submitted to Stanford University, Sep. 2007. 174 pages.
Seol, Hyeon-Cheon et al., "A 3.2Gbps Single-Ended Receiver Using Self-Reference Generation Technique for DRAM Interface," 2010 17th IEEE International Conference on Electronics, Circuits, and Systems (ICECS), Dec. 12-15, 2010, pp. 671-674. 4 pages.

* cited by examiner

*Primary Examiner* — Lihong Yu
(74) *Attorney, Agent, or Firm* — Silicon Edge Law Group LLP; Arthur J. Behiel

(57) ABSTRACT

A single-ended receiver compares signal levels representing current symbols to levels representing immediately preceding symbols to resolve the symbols. The receiver applies offsets selected based on resolved prior symbols to interpret successive like-symbols.

13 Claims, 7 Drawing Sheets

METHODS AND SYSTEMS FOR SELF-REFERENCING SINGLE-ENDED SIGNALS

BACKGROUND

Output driver circuits, or simply "drivers," transmit electronic signals onto various forms of communication channels, including transmission lines, cables, printed circuit board traces, or the like. Receivers on the opposite ends of the channels sense the electronic signals. There are many types and classes of drivers and receivers, each offering a combination of traits that make it more or less suitable for particular applications. For example, a "single-ended" (SE) driver transmits an information signal as a varying voltage or current signal over a single conductor; a single-ended receiver recovers the information by comparing the signal to a reference. A single-ended transmitter may express a logic one as a relatively high voltage, and a logic zero as a relatively low voltage. The transmitter may then transmit a signal that represents a series of symbols by switching between the high and low voltages as needed to represent the symbols. The resultant signal thus "swings" between high and low voltages in a pattern that represents the series of symbols. A receiver can then recover the symbols by comparing the voltage levels against a reference voltage between the high and low voltages, typically near the midpoint.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
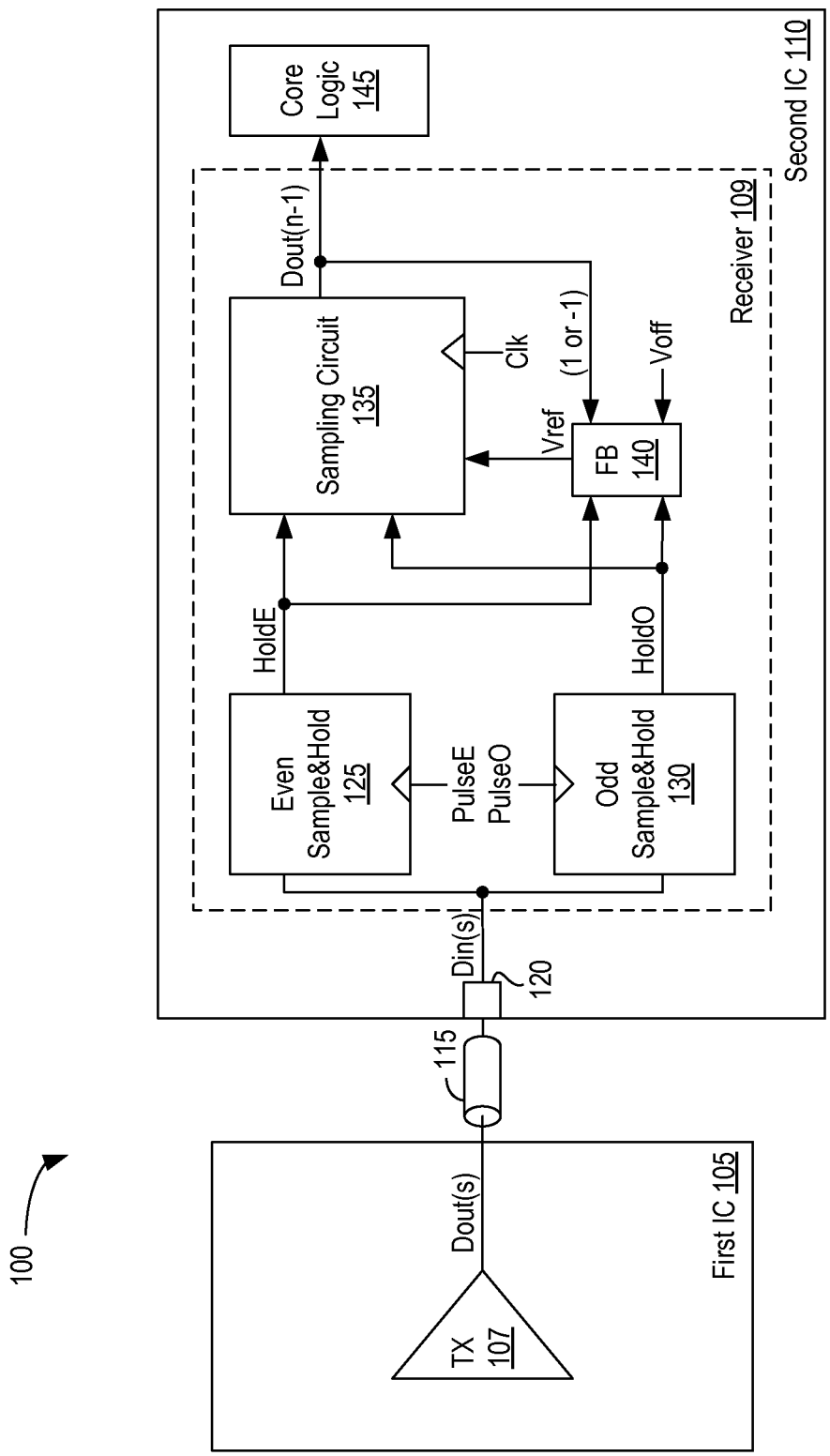
FIG. 1 depicts a communication system 100 in which a first integrated circuit (IC) 105 conveys a continuous-time data signal Dout(s) from a transmit driver 107 to a receiver 109 within a second IC 110 via a single-ended channel 115.

FIG. 1 depicts a communication system 100 in which a first integrated circuit (IC) 105 conveys a continuous-time data signal Dout(s) from a transmit driver 107 to a receiver 109 within a second IC 110 via a single-ended channel 115. IC 110 includes a data node 120 (e.g., an external pad) that receives a distorted version of the transmitted signal as an input signal Din(s). From the perspective of IC 110, signal Din(s) is expressed as a series of odd and even data symbols represented as odd and even signal levels. Data symbols representing logic ones and logic zeroes might be expressed as relatively high and low voltage levels, respectively, for example. Rather than compare the level of an incoming symbol with a fixed reference, each symbol is resolved with reference to the level and logic value of a preceding symbol.

Receiver 109 includes even and odd sample-and-hold (S&H) circuits 125 and 130, a sampling circuit 135, and a feedback circuit 140. These elements collectively recover the even and odd symbols of continuous signal Din(s) as a discrete output signal Dout(n−1) for use by some core logic 145. Core logic 145 could be any of a myriad of circuit types or combinations of circuit types (e.g., a memory array and related address and control circuits) that communicate with components within or external to IC 110. The designation "n" associated with output signal Dout(n−1) identifies the signal as discrete signal, and the "−1" indicates a delay of one symbol time. That is, signal Dout(n−1) is a discrete symbol delayed by one symbol time with respect to signal Din(s).

S&H circuit 125 samples each incoming even symbol level, on pulses of a signal PulseE that occur at or near the middle of the even symbols, and holds the resultant voltage until the next PulseE pulse. The resultant sequence of held voltages, signal HoldE, is provided to sampling circuit 135. S&H circuit 130 similarly samples and holds each incoming odd symbol level on pulses of a signal PulseO that occur during the odd signals to provide a signal HoldO to sampling circuit 135.

Sampling circuit 135 samples each even signal level of signal HoldE with reference to the immediately preceding odd signal level of signal HoldO to produce even samples, and samples each odd signal level of signal HoldO with reference to the immediately preceding even signal level of signal HoldE to produce odd samples. The even and odd samples are interlaced to produce signal Dout(n−1), which is a series of even and odd samples representative of the initial signal Dout(s) from transmit driver 107.

Feedback circuit 140 receives a calibrated offset voltage Voff and the even and odd samples of signal Dout(n). Feedback circuit 140 calculates a reference voltage Vref from these inputs. Signal Vref, applied to a like-identified reference node of sampling circuit 135, is employed to offset the sampling of each even and odd signal level based on the preceding discrete symbol represented by signal Dout(n−1).

Figure 2:
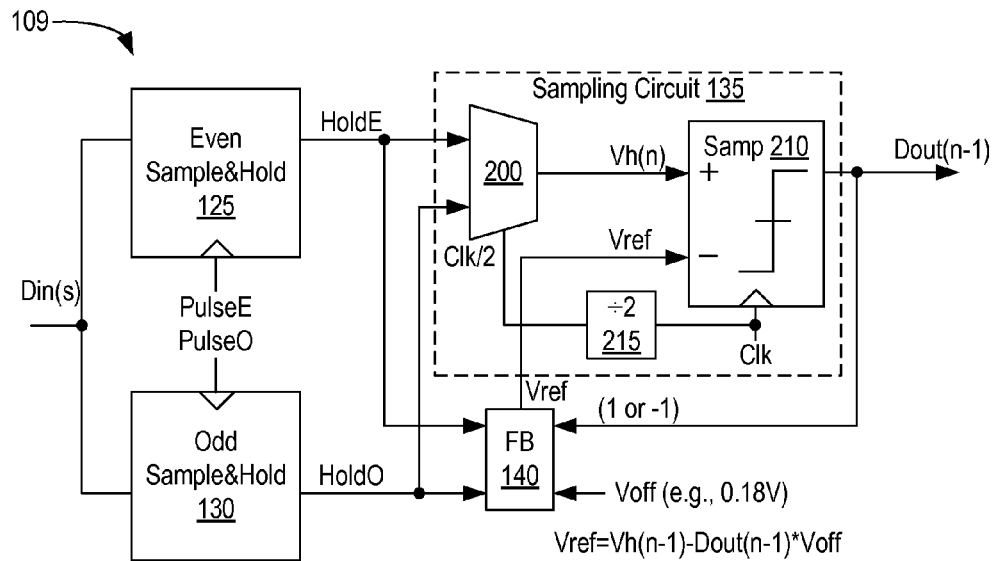
FIG. 2 depicts receiver 109 of FIG. 1 in accordance with one embodiment.

FIG. 2 depicts receiver 109 of FIG. 1 in accordance with one embodiment. In this example, sampling circuit 135 includes a multiplexer 200, a sampler 210, and a clock divider 215. Multiplexer 200 alternates between even and odd held levels of respective signal HoldE and HoldO based on the value of a half-rate clock signal Clk/2 that clock divider 215 derives from a receive clock signal Clk. Other embodiments can use different clocking schemes. The output of multiplexer 200 is a voltage signal Vh(n) representative of the current symbol under consideration, which alternates between the held odd and even voltage levels from the S&H circuits. Sampler 210 samples each of the held levels with respect to the changing reference voltage Vref, which feedback circuit 140 derives from the held levels of signals HoldE and HoldO, prior samples Dout(n−1), and a calibrated offset voltage Voff. The remaining elements of receiver 109 are the same or similar to like-identified elements of FIG. 1.

Figure 3:
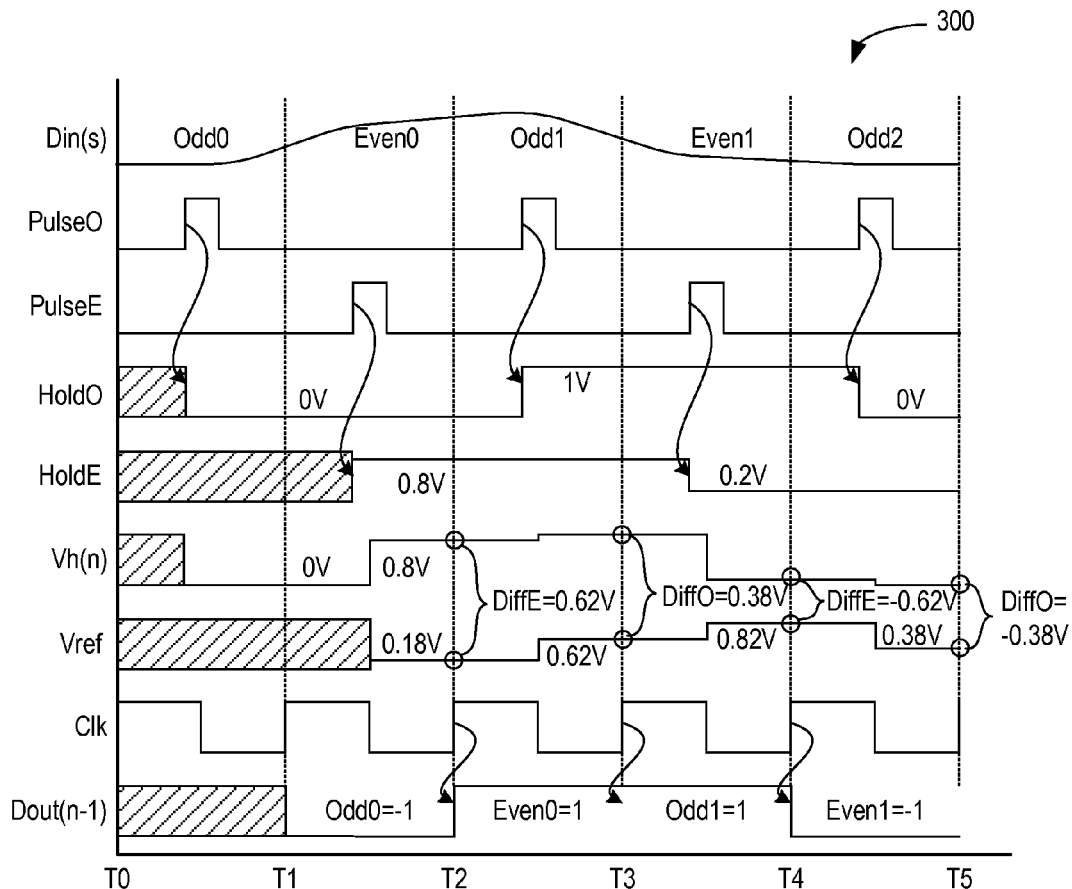
FIG. 3 is a waveform diagram 300 that describes the operation of receiver 109 of FIG. 2 in accordance with one embodiment.

FIG. 3 is a waveform diagram 300 that describes the operation of receiver 109 of FIG. 2 in accordance with one embodiment. Signal names in diagram 300 correspond to like-identifies nodes in FIG. 2. Whether a given reference is to a signal or a corresponding node will be clear in context.

The X axis of FIG. 3 divides time into five unit intervals. Based on the assumption that relatively low and high voltages represent respective logic zero and logic one values, the uppermost signal Din(s) of FIG. 3 shows the incoming signal to express the data pattern b01100. The first, third, and fifth bits are odd symbols Odd0, Odd1, and Odd2; whereas the second and fourth bits are even symbol Even0 and Even1. Signal PulseO is asserted during the odd intervals, causing S&H circuit 130 to sample and hold the voltage of each odd symbol until the next odd symbol. Signal HoldO therefore transitions between held values for every odd symbol.

Signal PulseE is asserted during the even intervals, causing S&H circuit 125 to sample and hold the voltage of each even symbol until the next even symbol. Signal HoldE therefore transitions between held values for every even symbol. In this example the even symbols Even0 and Even1 are both distorted by ISI from adjacent odd symbol levels. The level of symbol Even0, ideally 1.0V, is reduced to 0.8V by adjacent symbol Odd0; and the level of symbol Even1, ideally 0.0V, is increased to 0.2V by adjacent symbol Odd1.

Signal Vh(n) alternates between signals HoldO and HoldE at half the rate of clock signal Clk so that the odd and even signal levels are presented to sampler 210 at the appropriate times. Feedback circuit 140 calculates signal Vref as follows:

$$Vref = Vh(n-1) - Dout(n-1)*Voff \quad \text{Eq. (1)}$$

where Vh(n−1) is the held voltage of the preceding symbol, Dout(n−1) is the resolved binary value of the preceding symbol, and Voff is a calibrated offset voltage (0.18V in this example). A Dout(n−1) that represents a logic zero is treated as a negative one (−1) for calculating voltage Vref.

Sampler 210 samples signal Vh(n) on rising edges of clock signal Clk. When there is a transition between the current and immediately prior symbols, such as at time T2, the input voltages to sampler 210 would generally be sufficiently different absent the applied offset for sampler 210 to resolve the current symbol. If there is no transition between symbols, however, the offset is required to resolve the current symbol. In the instant example, feedback circuit 140 skews reference voltage Vref up from the prior held voltage Vh(n−1) by 0.18V if the prior resolved symbol Dout(n−1) is a logic zero, and down from the prior held voltage Vh(n−1) by 0.18V if the prior resolved symbol Dout(n−1) is a logic one. With the appropriate applied offset, sampler 210 can correctly resolve the current bit absent a signal transition. At time T3, for example, sampler 210 resolves symbol Odd1 by comparing signal HoldO at 1.0V with Vref at 0.62V, where the 0.62V level is the 0.8V level of signal HoldE at the prior symbol minus the 0.18V offset. The offset is subtracted because the digital value of prior symbol was a one; were it a zero, the offset would be added.

Figure 4:
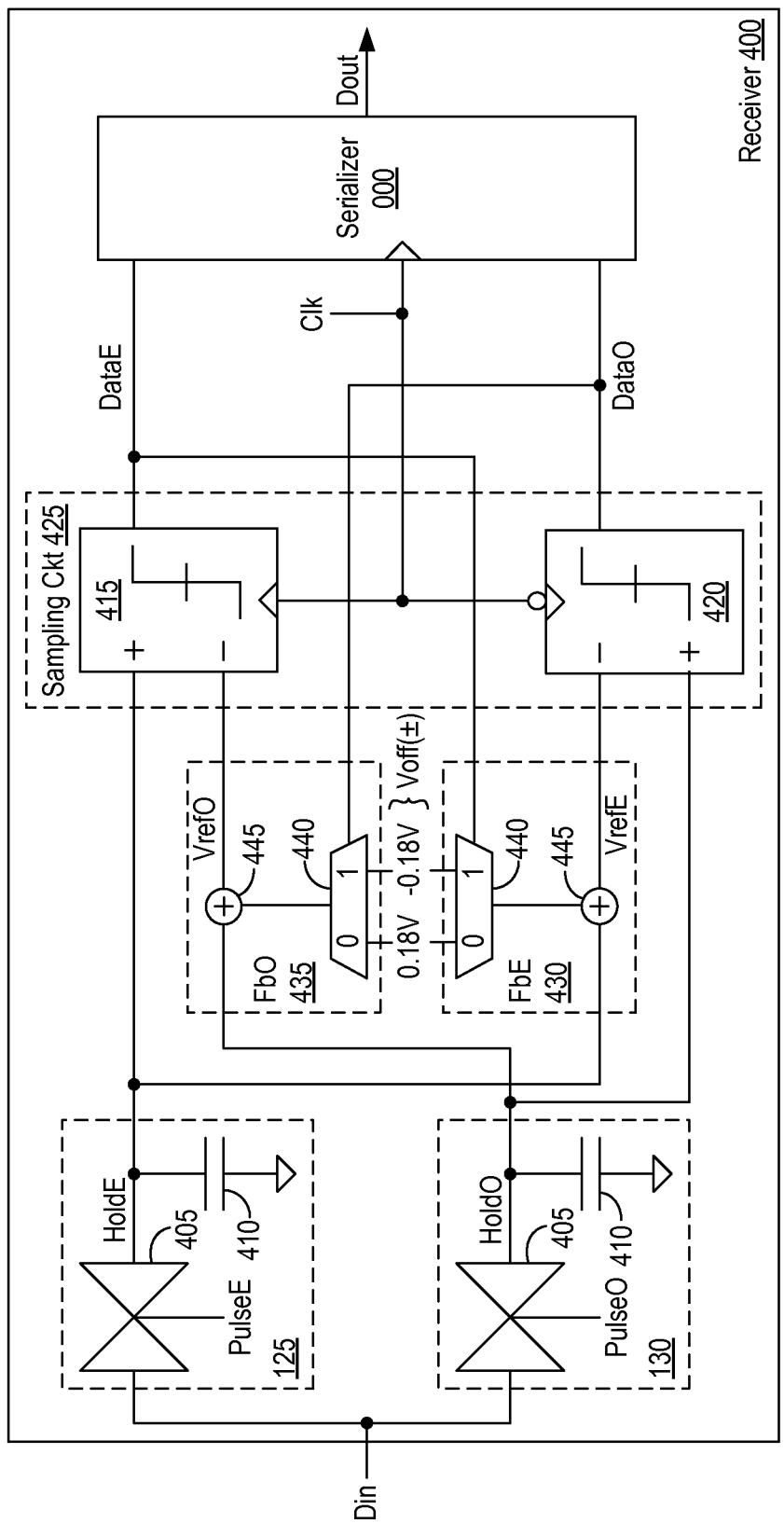
FIG. 4 depicts a receiver 400 in accordance with another embodiment.

FIG. 4 depicts a receiver 400 in accordance with another embodiment. Receiver 400 is in some ways similar to receiver 109 of FIGS. 1 and 2, with like-identified elements being the same or similar.

Receiver 400 includes even and odd S&H circuits 125 and 130, each of which includes a pass gate 405 and a capacitance 410. S&H circuit 125 samples signal Din and holds the sampled charge on capacitance 410 when pass gate 405 is enabled by a pulse of signal PulseE to produce signal HoldE. S&H circuit 130 works identically, but on pulses of signal PulseO to produce signal HoldO.

Signals HoldE and HoldO are conveyed directly to the non-inverting inputs of respective even and odd samplers 415 and 420, collectively a sampling circuit 425. Signals HoldE and HoldO are also conveyed indirectly to the inverting inputs of respective samplers 420 and 415 via respective portions 430 and 435 of a feedback circuit. Each portion includes a multiplexer 440 that applies either a negative or a positive version of an offset voltage Voff to summer 445 based on the digital value of a prior resolved symbol. That is, the polarity of the applied offset voltage depends on the logic state of the preceding symbol. The magnitude of the offset is the same for both polarities in this embodiment.

Consider the case in which S&H circuits 125 and 130 are holding voltage levels for a current, even data symbol Din(n) and a prior odd data symbol Din(n−1). Because the current symbol is even, the immediate predecessor is the level of signal DataO from sampler 420, which is fed back to multiplexer 440 of feedback portion 435. Summer 445 adds the selected offset value to the level held by S&H circuit 125 to produce an offset odd reference voltage VrefO for the inverting input of sampler 415. Sampler 415 samples the resultant difference voltage on the next rising edge of clock signal Clk to produce the current digital value for an even signal DataE. That symbol and the held level from S&H circuit 125 then serve as inputs to feedback portion 430 to create an even reference voltage VrefE for sampler 420 to resolve the next odd symbol. The process continues to alternate for each subsequent even and odd symbols to produce a pair of half-rate data streams DataE and DataO. A serializer combines these data streams to produce a serial data stream Dout.

Figure 5:
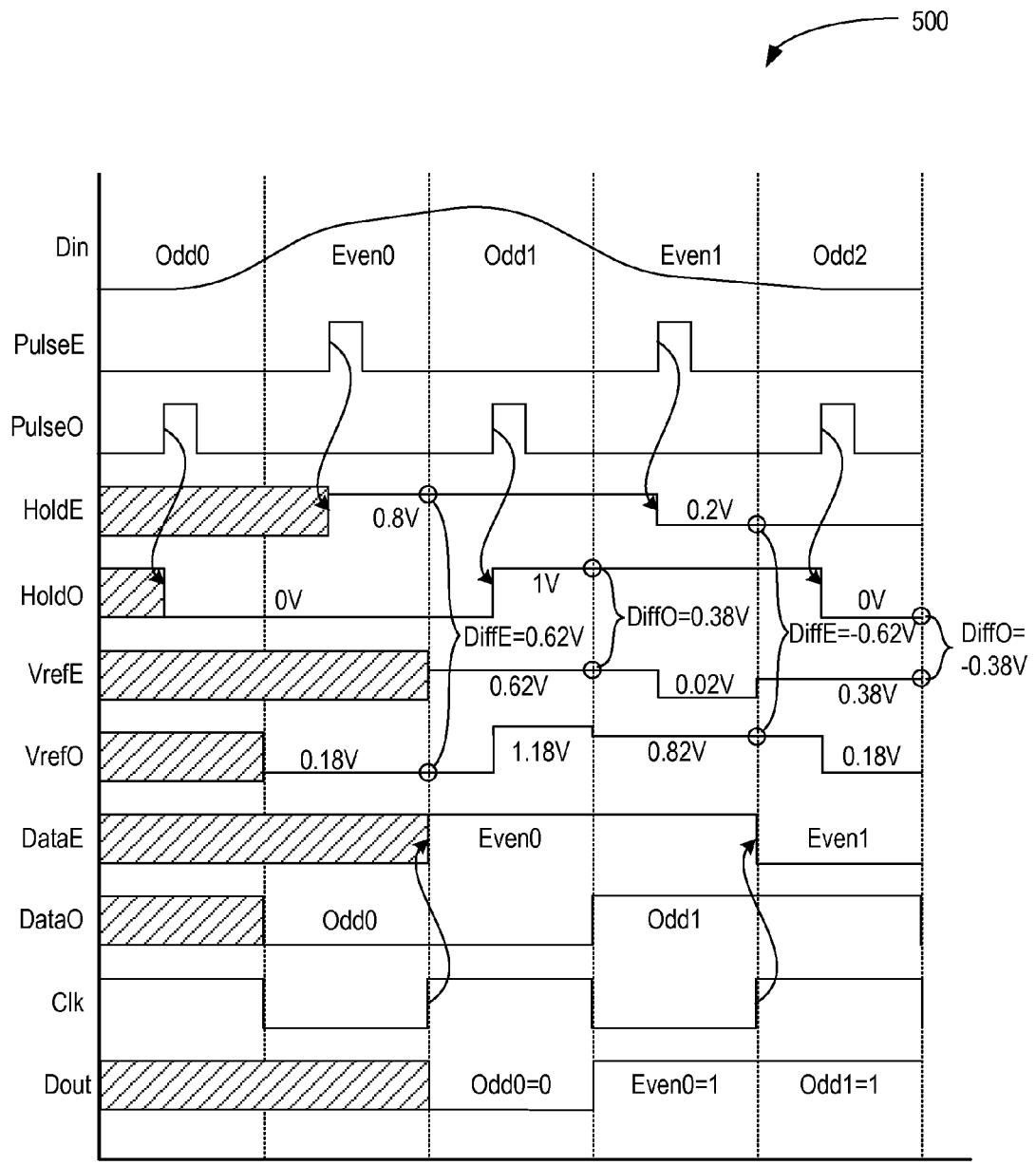
FIG. 5 is a waveform diagram 500 illustrating the operation of receiver 400 of FIG. 4 in accordance with one embodiment.

FIG. 5 is a waveform diagram 500 illustrating the operation of receiver 400 of FIG. 4 in accordance with one embodiment. The operation of receiver 400 is similar to that of receiver 109, detailed previously, so a detailed discussion of FIG. 5 is omitted for brevity.

Figure 6:
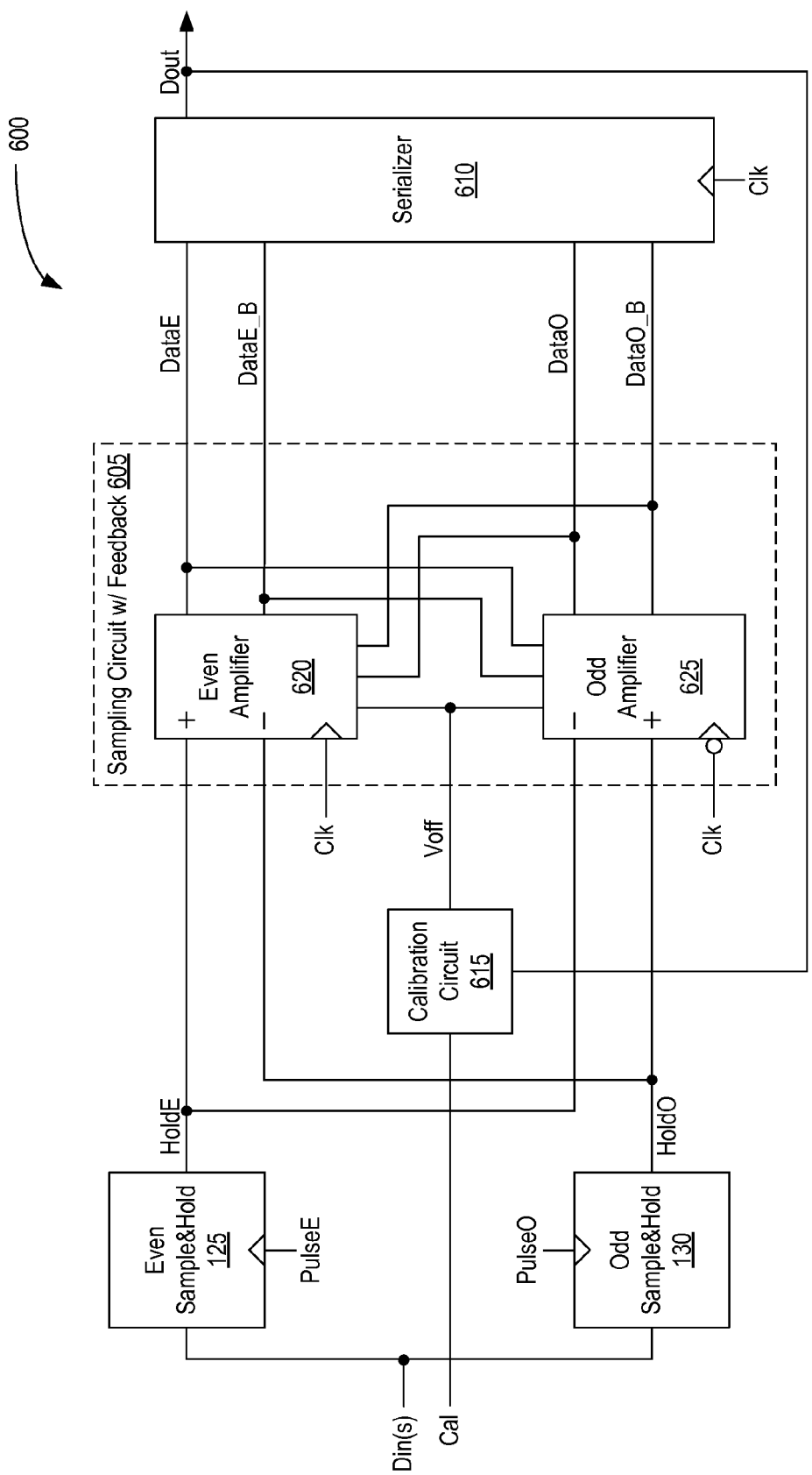
FIG. 6 depicts a receiver 600 in accordance with another embodiment.

FIG. 6 depicts a receiver 600 in accordance with another embodiment. Even and Odd S&H circuits 125 and 130 operate as detailed previously to deliver signals HoldE and HoldO to a sampling circuit 605 that produces differential even and odd data DataE/DataE_B and DataO/DataO_B. A serializer 610 serializes this even and odd data to produce data signal Dout, which is provided to some core logic (not shown). Output data Dout is also provided to a calibration circuit 615 to support a calibration procedure used to derive an offset voltage Voff. Calibration is controlled via a control port Cal, and is described below in connection with FIG. 8.

Sampling circuit 605 includes even and odd differential amplifiers 620 and 625, the outputs of which are connected to serializer 610. Amplifiers 620 and 625 are clocked comparators in this example. To a first approximation, even amplifier 620 compares signals HoldE and HoldO on rising edges of a clock signal Clk, driving differential output signals DataE and DataE_B high and low, respectively, if signal HoldE is greater than HoldO; and odd amplifier 625 compares signals HoldO and HoldE on falling edges of clock signal Clk, driving output signals DataO and DataO_B high and low, respectively, if signal HoldO is greater than HoldE. The amplified odd and even signal levels are then conveyed to serializer 610.

Absent a transition between adjacent symbols, the input voltage across the input nodes of amplifiers 620 and 625 would essentially be zero, and the resultant sampled data would be random. Assuming amplifier 620 is comparing identical or nearly identical voltage levels, for example, data DataE/DataE_B could be representative of either a logic one or a logic zero. The offset provided by voltage Voff and feedback from the odd sampler 635 allows receiver 600 to interpret successive like-symbols.

Figure 7:
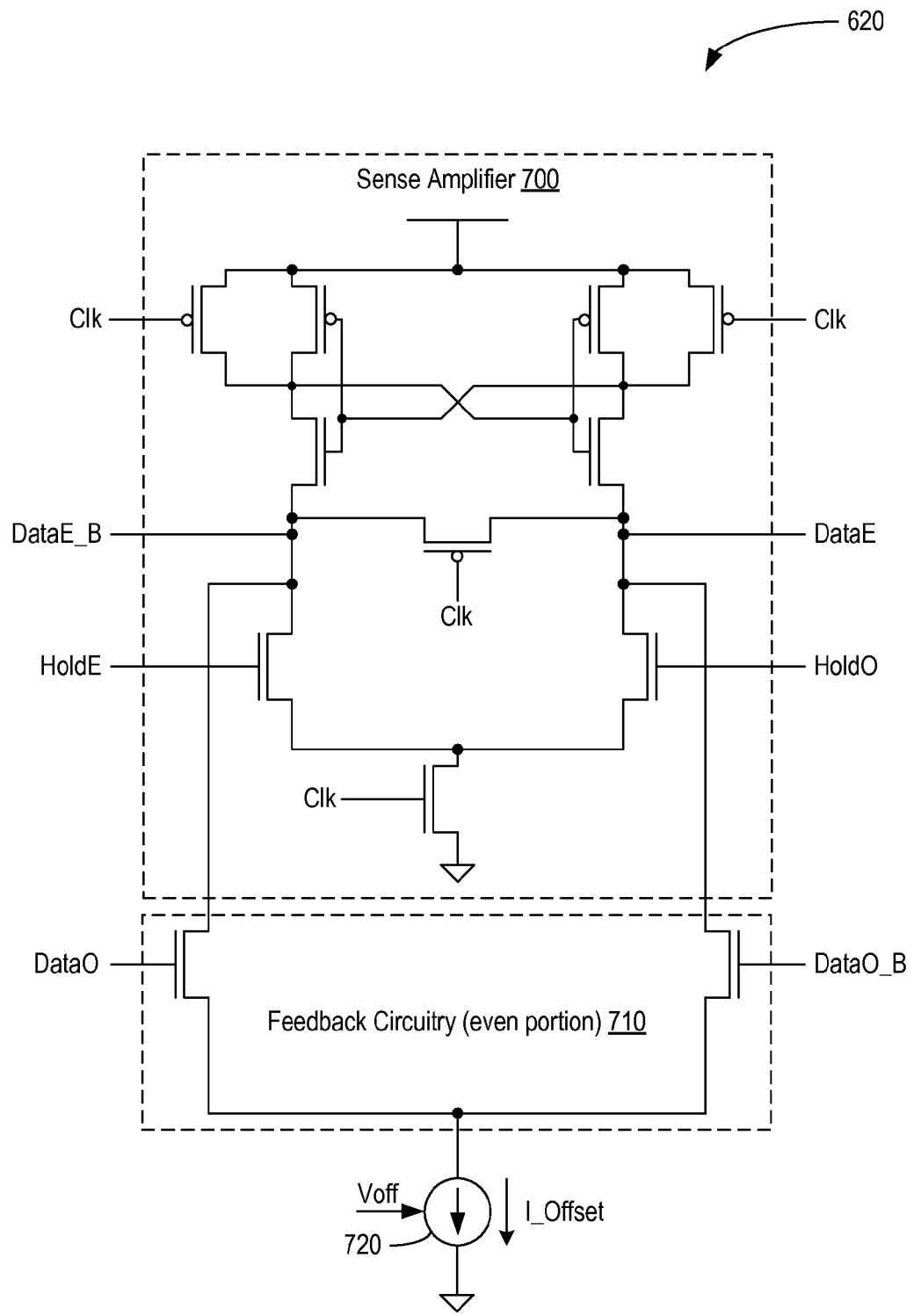
FIG. 7 schematically depicts amplifier 620 of FIG. 6.

FIG. 7 schematically depicts amplifier 620 of FIG. 6. Amplifier 625 is identical in this embodiment, with input and output nodes as shown in FIG. 6. Amplifier 620 includes a sense amplifier 700, feedback circuitry 710, and a current source 720. Ignoring the effects of feedback, a differential transistor pair receives held voltage signals HoldE and HoldO. Whichever is higher causes the respective one of nodes DataE_B and DataE to fall, and the other to rise, on the rising edge of clock signal Clk. If the voltages of signals HoldE and HoldO are the same, then the output levels on nodes DataE_B and DataE could go either way.

Offset voltage Voff is calibrated to set an offset current I_Offset through feedback circuitry 710, and consequently impose an offset that controls the behavior of the sense amplifier when signals HoldE and HoldO are at or near the same level. Feedback circuitry 710 steers offset current I_Offset from one of the output nodes of sense amplifier 700 based on the sensed value DataO/DataO_B of the immediately preceding odd symbol. Sense amplifier 700 is thus biased to resolve similar held voltages HoldE and HoldO in favor of either a logic one or a logic zero depending upon the resolved value of the preceding symbol.

Assume, for example, that amplifier 620 is to resolve an even logic-one symbol, represented by a relatively high held voltage HeldE, immediately following an odd logic-one symbol represented by essentially the same voltage HeldO. The odd amplifier 625 (FIG. 6) will have resolved the preceding logic-one bit, leaving signals DataO and DataO_B high and low, respectively. Feedback circuitry 710 will therefore steer offset current I_Offset through the left branch of sense amplifier 700, tending to pull node DataE_B down. Feedback provided by sense amplifier 700 causes node DataE to rise as node DataE_B falls. As a consequence, sense amplifier 700 drives nodes DataE and DataE_B high and low, respectively, despite equivalent voltages on nodes HoldE and HoldO. The voltage differential applied across nodes HoldE and HoldO to overcome this applied offset depends on current I_Offset, and consequently on voltage Voff. Calibration circuit 615 (FIG. 6) tunes voltage Voff so that the offset applied to amplifiers 620 and 625 allows sampling circuit 605 to resolve adjacent like-symbols, and those separated by a transition.

Figure 8:
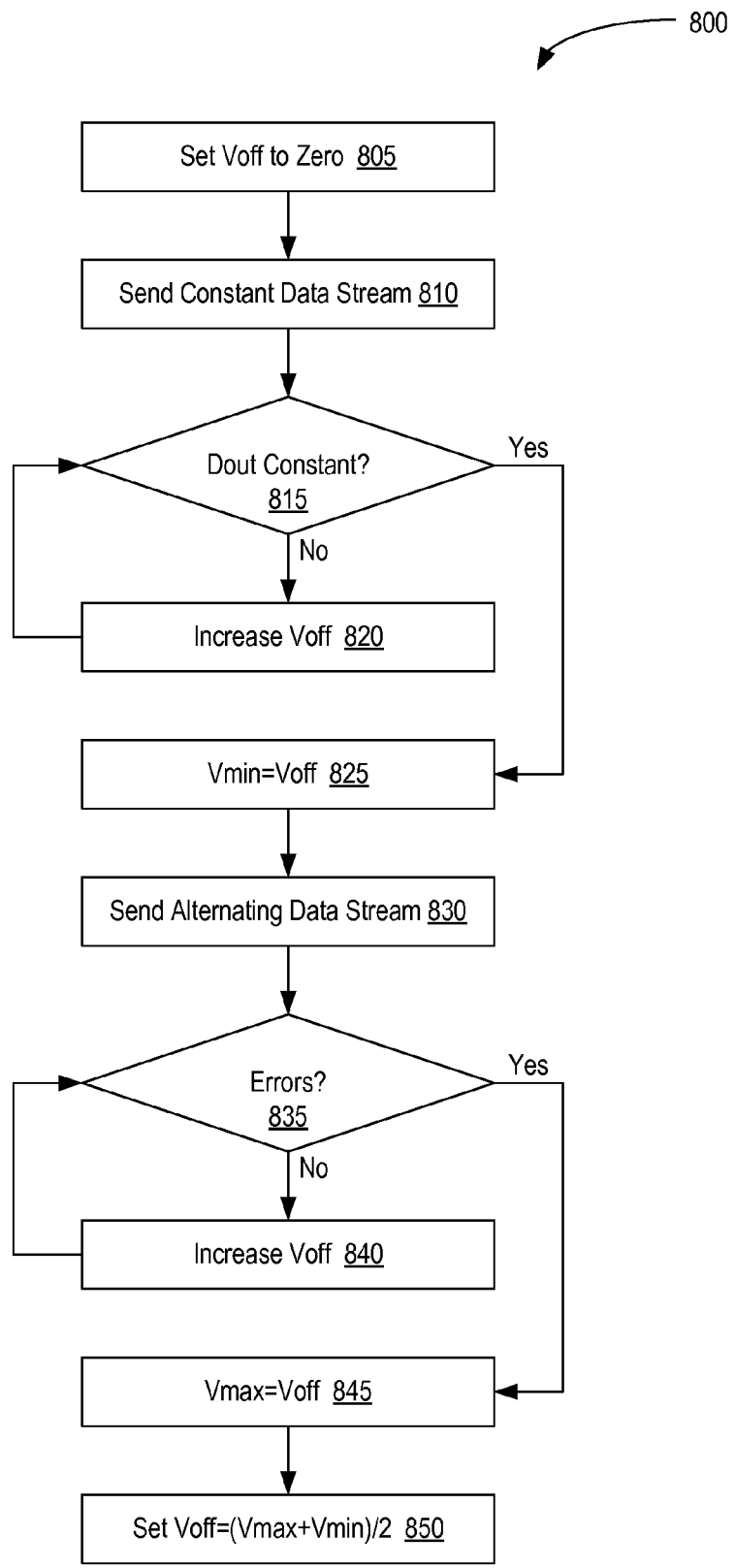
FIG. 8 is a flowchart 800 illustrating a calibration sequence carried out by one embodiment of calibration circuit 615 of FIG. 6.

FIG. 8 is a flowchart 800 illustrating a calibration sequence carried out by one embodiment of calibration circuit 615 of FIG. 6. The calibration sequence can be carried out once, such as at start-up, or can be repeated to account for performance drift due to e.g. temperature and supply-voltage fluctuations.

Beginning at 805, calibration circuit 615 sets offset voltage Voff to zero, which zeroes the offset applied to sampling circuit 605. Next, at 810, a transmitter (not shown) transmits a constant stream of logic one or logic zero data values to receiver 600 via input node Din(s). Calibration circuit 615 can make use of a backchannel by which to control the transmitter, or both the transmitter and calibration circuit 615 can receive calibration instructions from circuitry within or external to the system. Test signals can be generated on the same IC as receiver 600 in other embodiments.

Data signal Dout from receiver 600 will randomly transition between signal levels until the offset is adequate to overcome whatever noise-induced differences appear between nodes HoldE and HoldO. Calibration circuit therefore monitors data Dout (decision 815) and increases voltage Voff (820) until signal Dout is constant. The minimum offset voltage required to produce a constant signal Dout is then stored as a minimum offset voltage Vmin (825).

Next, the transmitter then conveys a stream of alternating ones and zeros to receiver 600 via input node Din(s) (830) while calibration circuit 615 monitors for errors (decision 835), such as the occasional receipt of successive like values. Calibration circuit 615 increases voltage Voff (840) until there are errors, and then stores the resultant offset voltage as a maximum voltage Vmax (845). The offset voltage Voff is then calibrated to the average of voltage Vmax and Vmin (850), or to some other desired voltage between voltages Vmax and Vmin.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and offsets described as changing voltages levels can be implemented using changing currents.

While the present invention has been described in connection with specific embodiments, after reading this disclosure variations of these embodiments will be apparent to those of ordinary skill in the art. For example, any signal that conveys timing information via transitions, and that has sufficient transition density to convey enough of the requisite timing information, can serve as a timing-reference signal. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. A circuit comprising:
   a data node to receive a series of data symbols, including even data symbols and odd data symbols represented as even and odd signal levels;
   an even sample-and-hold circuit coupled to the data node to sample and hold the even signal levels;
   an odd sample-and-hold circuit coupled to the data node to sample and hold the odd signal levels;
   a sampling circuit coupled to the even and odd sample-and-hold circuits, the sampling circuit to compare the even signal levels to the odd signal levels to produce even samples, and to compare the odd signal levels to the even signal levels to produce odd samples; and
   a feedback circuit coupled to the sampling circuit, the feedback circuit to offset the comparisons that produce the even and odd samples, respectively, based on immediately prior odd and even samples;
   wherein the feedback circuit applies, for an even sample, an offset of a first polarity when the immediately prior odd sample represents a first logic state, and applies an offset of a second polarity when the immediately prior odd sample represents a second logic state; and
   wherein the offset of the first polarity is of a magnitude and the offset of the second polarity is of the same magnitude.

2. The circuit of claim 1, further comprising an amplifier, wherein the even and odd sample-and-hold circuits are coupled to the sampling circuit via the amplifier.

3. The circuit of claim 1, wherein the sampling circuit includes an amplifier connected to the feedback circuit.

4. The circuit of claim 1, wherein the sampling circuit includes a data node and a reference node, and wherein the feedback circuit applies the offset to the reference node.

5. The circuit of claim 1, wherein the sampling circuit includes an even sampler to produce the even samples and an odd sampler to produce the odd samples.

6. The circuit of claim 5, wherein the even sampler compares each of the even signal levels to an immediately preceding odd signal level with an applied one of the offsets, and wherein the feedback circuit selects the one of the offsets based on the odd sample of the immediately preceding odd signal.

7. The circuit of claim 1, further comprising a calibration circuit to derive the offsets from the odd and even data samples.

8. The circuit of claim 1, further comprising a serializer coupled to the sampling circuit to combine the odd and even samples into a serial data stream.

9. The circuit of claim 3, wherein the sampling circuit further includes a second amplifier connected to the feedback circuit.

10. The circuit of claim 9, wherein the first-mentioned amplifier compares the even signal levels with the odd signal levels to amplify the even signal levels, to provide amplified even signal levels, and the second amplifier compares the odd signal levels with the even signal levels to amplify the odd signal levels to provide amplified odd signal levels.

11. The circuit of claim 3, wherein the amplifier includes differential output nodes connected to the feedback circuit.

12. The circuit of claim 11, wherein the sampling circuit further includes a sampler connected to the output nodes.

13. The circuit of claim 10, further comprising even and odd samplers to sample the respective amplified even and odd signal levels.

\* \* \* \* \*